(12) United States Patent
Lynch et al.

(10) Patent No.: US 9,000,674 B2
(45) Date of Patent: *Apr. 7, 2015

(54) MULTIPLE STAGE SEQUENTIAL CURRENT REGULATOR

(71) Applicant: Supertex, Inc., Sunnyvale, CA (US)

(72) Inventors: Scott Lynch, Half Moon Bay, CA (US); Benedict C. K. Choy, Sunnyvale, CA (US)

(73) Assignee: Microchip Technology Inc., Chandler, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/229,587

(22) Filed: Mar. 28, 2014

(65) Prior Publication Data
US 2014/0210363 A1 Jul. 31, 2014

Related U.S. Application Data

(63) Continuation of application No. 13/210,155, filed on Aug. 15, 2011, now Pat. No. 8,686,651.

(60) Provisional application No. 61/475,196, filed on Apr. 13, 2011.

(51) Int. Cl.
| | |
|---|---|
| *H05B 37/00* | (2006.01) |
| *H05B 39/00* | (2006.01) |
| *H05B 41/00* | (2006.01) |
| *B23K 11/24* | (2006.01) |
| *G05B 24/02* | (2006.01) |
| *H02J 1/00* | (2006.01) |
| *H02J 3/12* | (2006.01) |
| *H05B 33/08* | (2006.01) |

(52) U.S. Cl.
CPC ........ *H05B 33/0815* (2013.01); *H05B 33/0818* (2013.01); *H05B 33/0827* (2013.01); *H05B 33/083* (2013.01); *Y02B 20/347* (2013.01)

(58) Field of Classification Search
None
See application file for complete search history.

(56) References Cited

U.S. PATENT DOCUMENTS

| | | |
|---|---|---|
| 4,403,280 A | 9/1983 | Okado |
| 4,707,777 A | 11/1987 | Cho |
| 5,278,432 A | 1/1994 | Ignatius et al. |

(Continued)

OTHER PUBLICATIONS

PCT International Search Report of PCT/US12/33635; dated Sep. 24, 2012 (5 pgs.).

(Continued)

*Primary Examiner* — Douglas W Owens
*Assistant Examiner* — Dedei K Hammond
(74) *Attorney, Agent, or Firm* — Brent Yamashita; DLA Piper LLP US

(57) ABSTRACT

An LED driver circuit for controlling direct current supplied to a plurality of serially connected segments of Light Emitting Diodes (LEDs) is disclosed. In one embodiment, the LED driver circuit comprises a self-commutating circuit, which comprises a plurality of current control elements, each current control element having two ends, a first end connected to a different end of each segment along the plurality of serially connected segments of LEDs and a second end connected to a path to ground. The path to ground comprises a sense resistor and the path to ground is shared by the second end of each current control element. Each current control element is coupled to an adjacent current control element by a cross-regulation circuit and controlled by a signal from an adjacent current control element.

23 Claims, 13 Drawing Sheets

Self-Commutating Circuit

(56) References Cited

U.S. PATENT DOCUMENTS

| | | |
|---|---|---|
| 6,989,807 B2 | 1/2006 | Chiang |
| 7,081,722 B1 | 7/2006 | Huynh et al. |
| 7,262,559 B2 | 8/2007 | Tripathi et al. |
| 7,719,202 B2 | 5/2010 | Cheng et al. |
| 8,164,276 B2 * | 4/2012 | Kuwabara ............ 315/294 |
| 2003/0128056 A1 | 7/2003 | Nilson et al. |
| 2010/0253245 A1 | 10/2010 | Du et al. |

OTHER PUBLICATIONS

PCT Written Opinion of the International Searching Authority of PCT/US12/33635; dated Sep. 24, 2012 (7 pgs.).

PCT International Preliminary Report on Patentability of PCT/US12/33635; dated Oct. 15, 2013 (1 pg.).

* cited by examiner

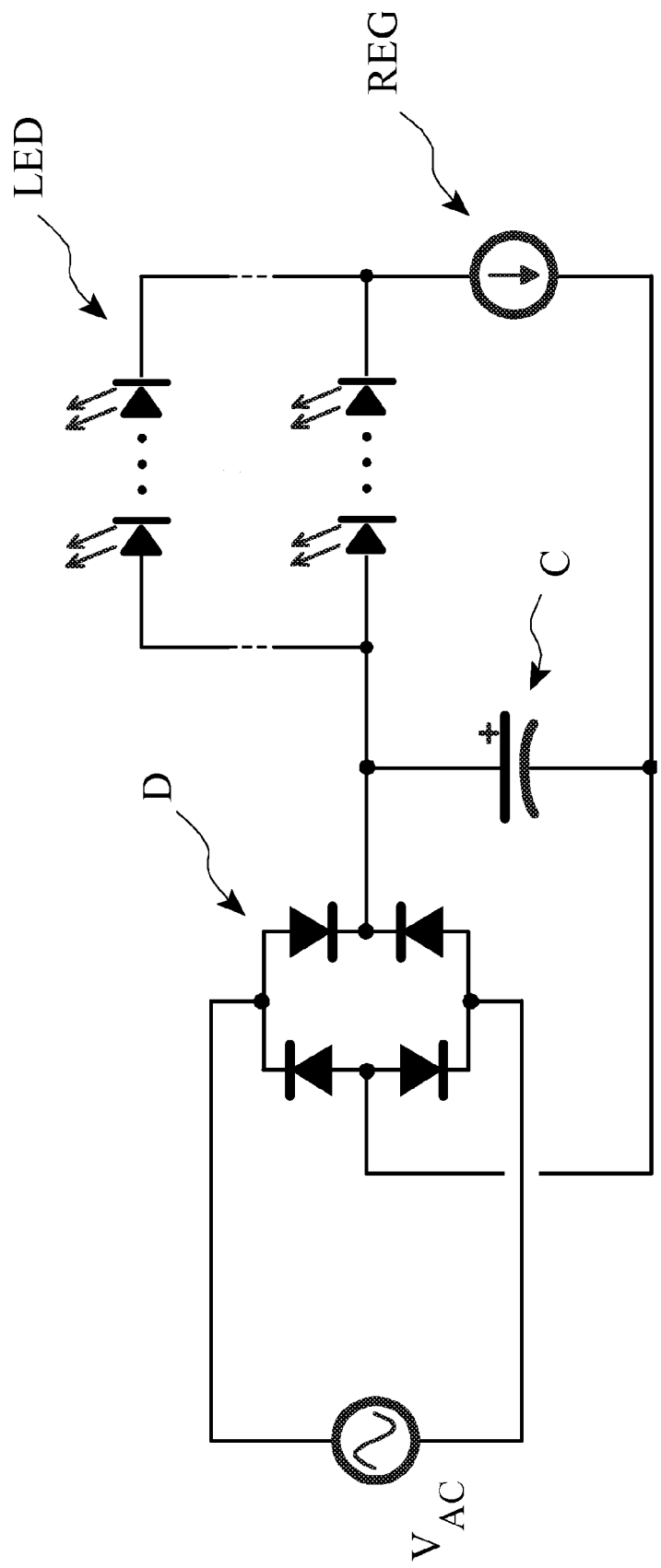
Figure 1: Linear Constant Current LED Driver (Prior Art)

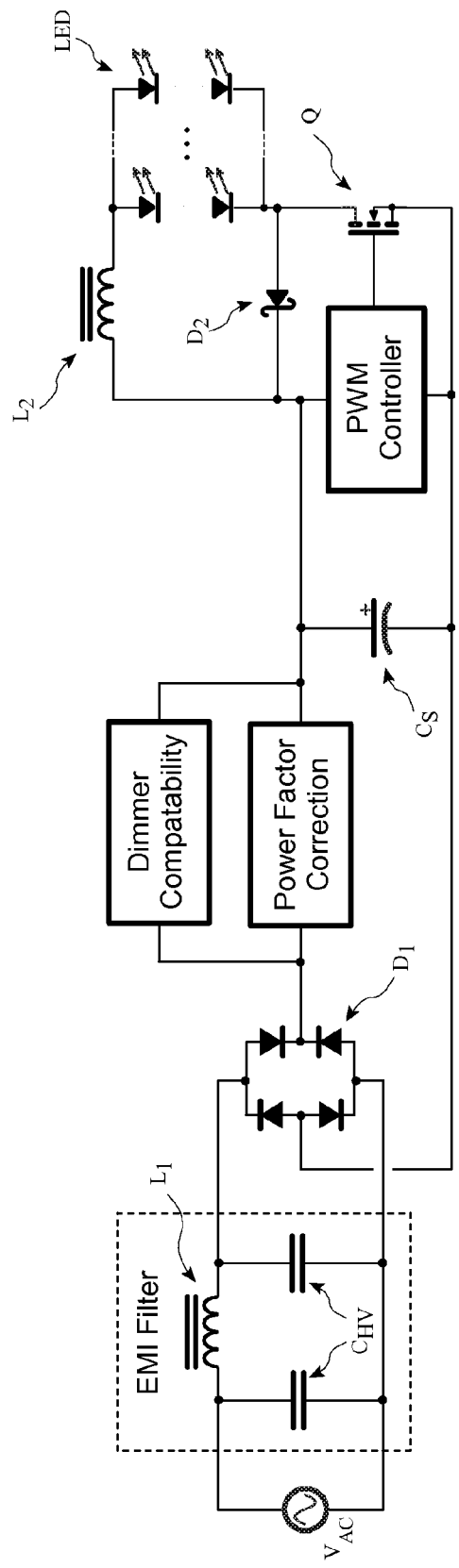
Figure 2: Typical Switching LED Driver (Prior Art)

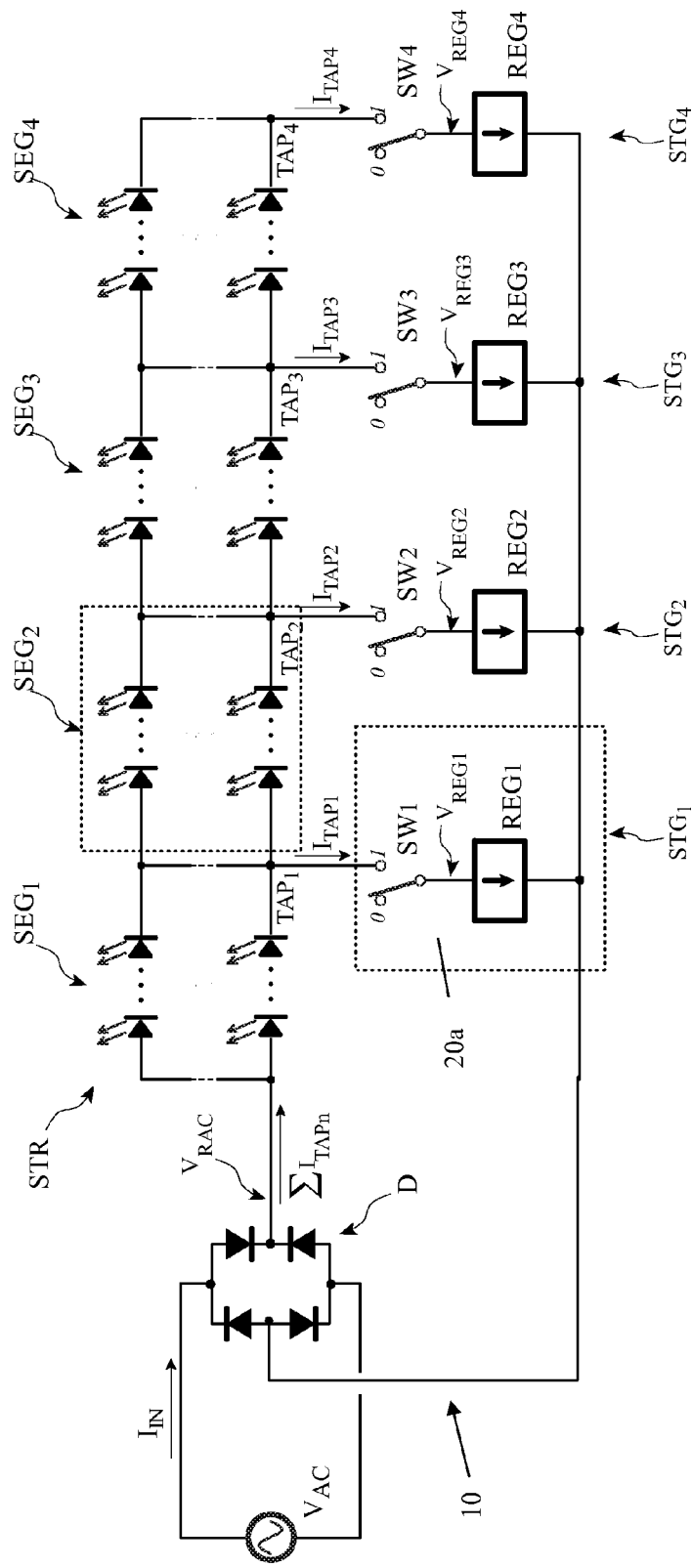
Figure 3: Sequential Regulator LED Driver

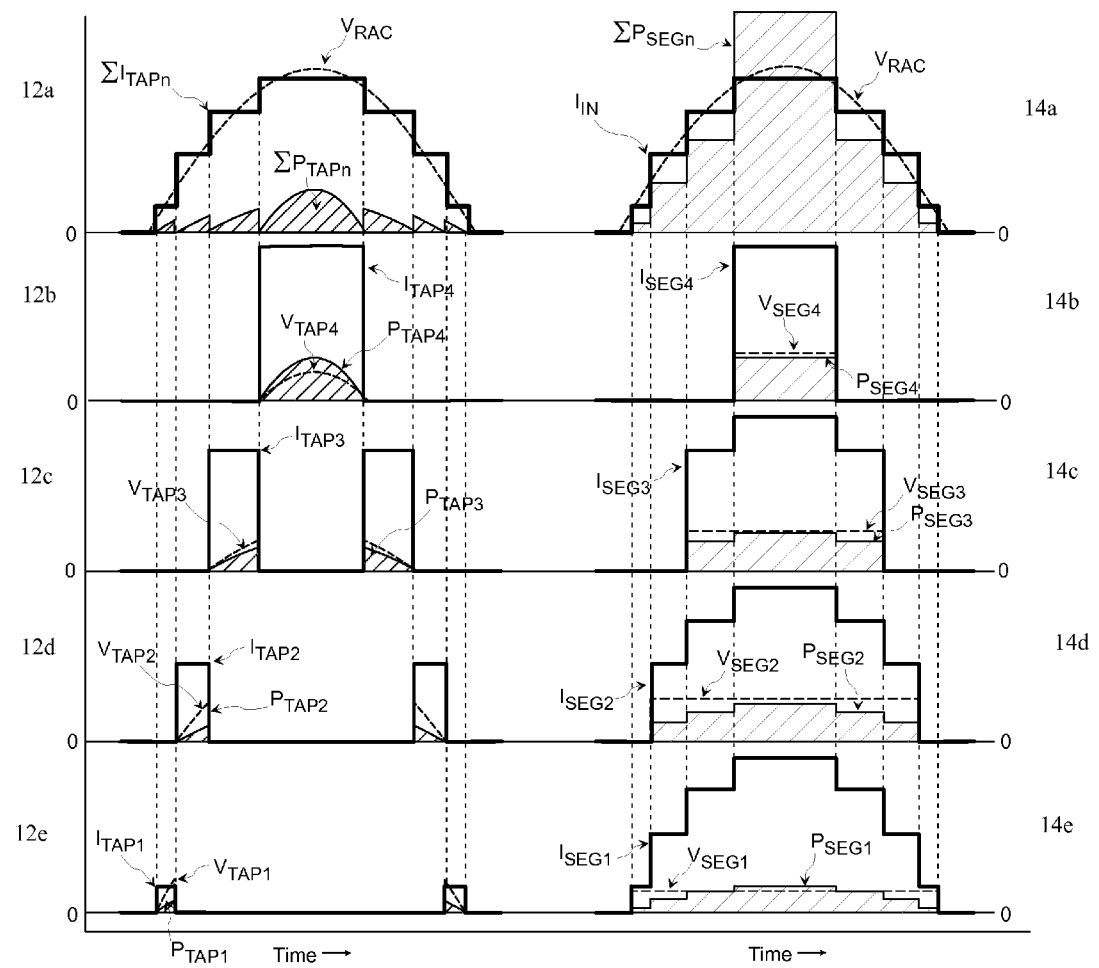
Figure 4: Sequential Current Regulator Timing

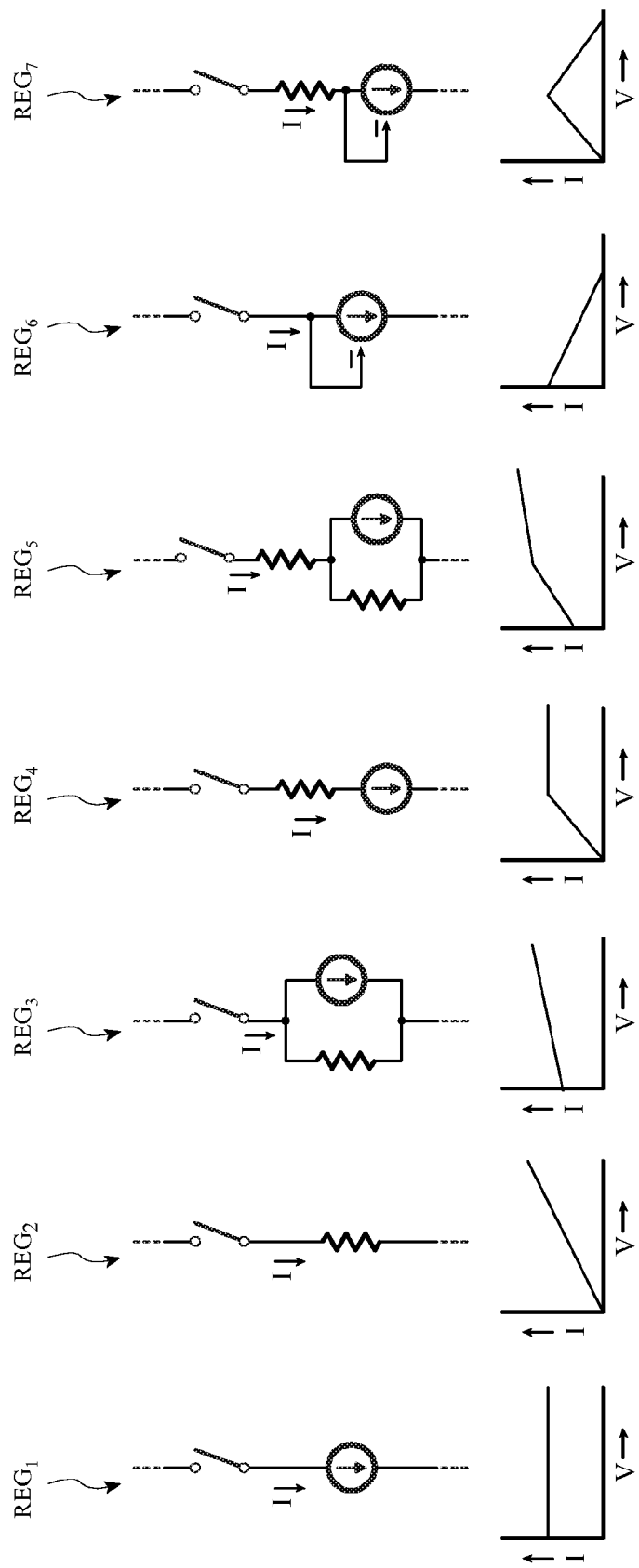
Figure 5: Various Current Control Circuits

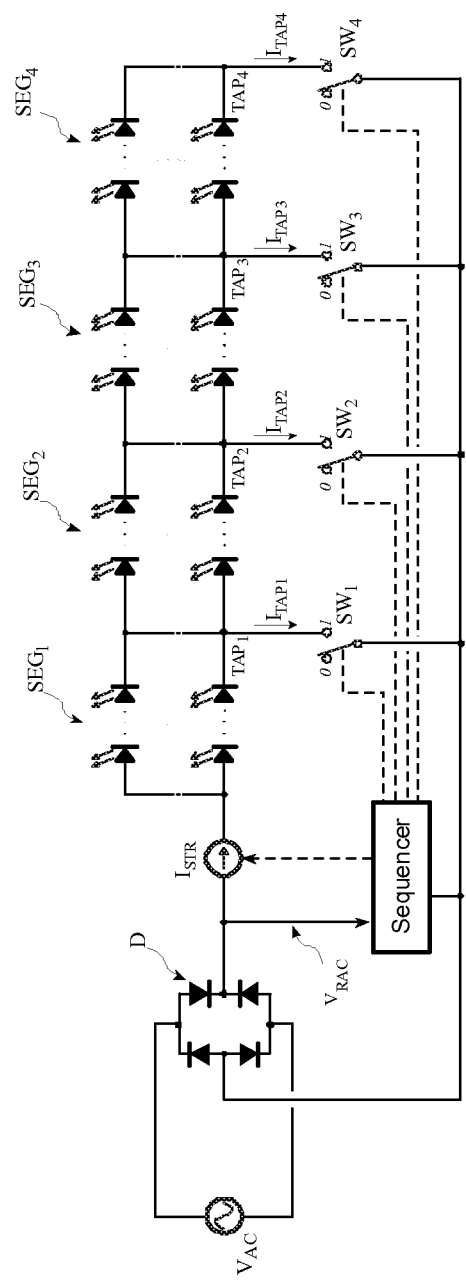
Figure 6: Centralized Sequencing (Prior Art)

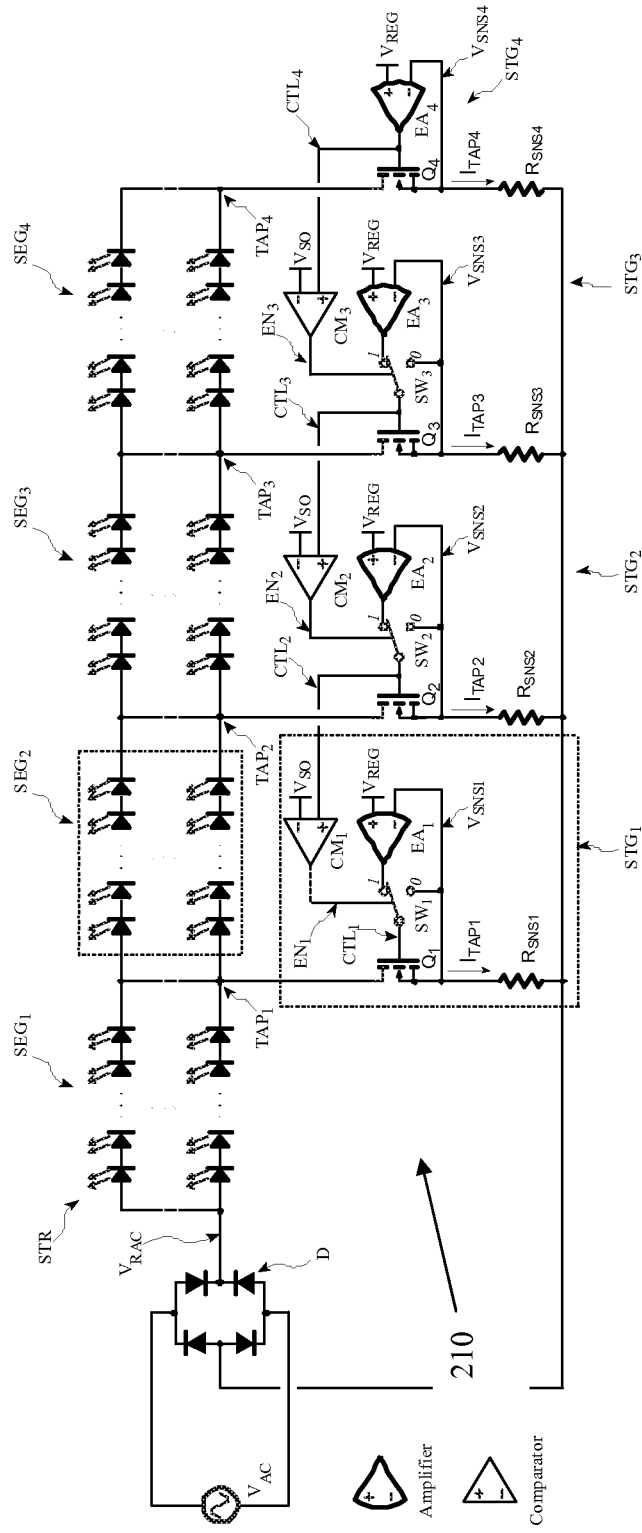
Figure 7: Self-Commutating Circuit

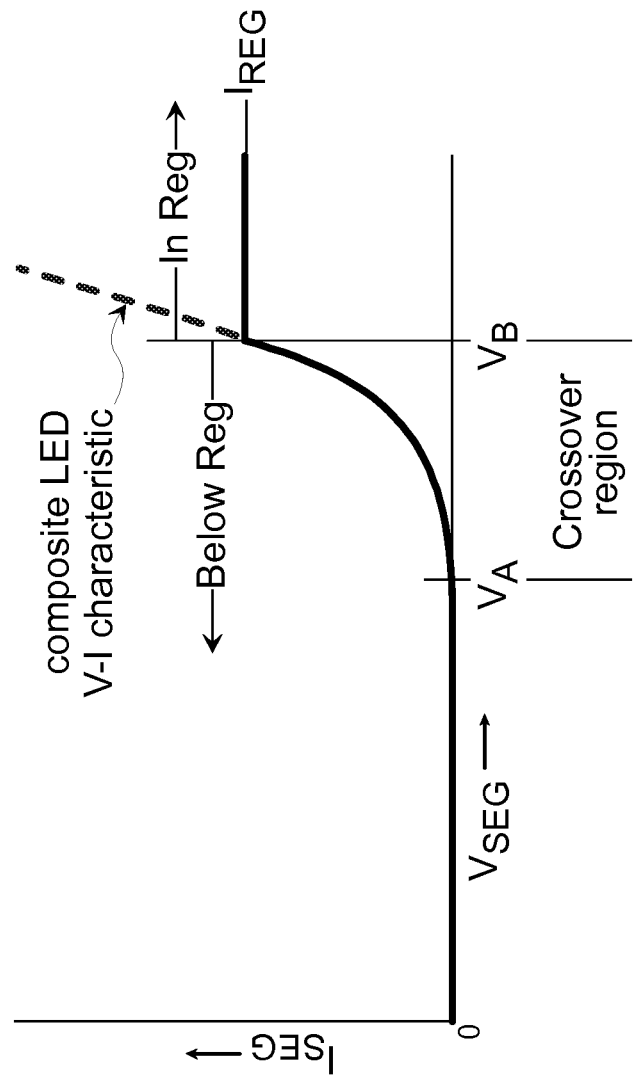
Figure 8: LED String Segment Characteristics

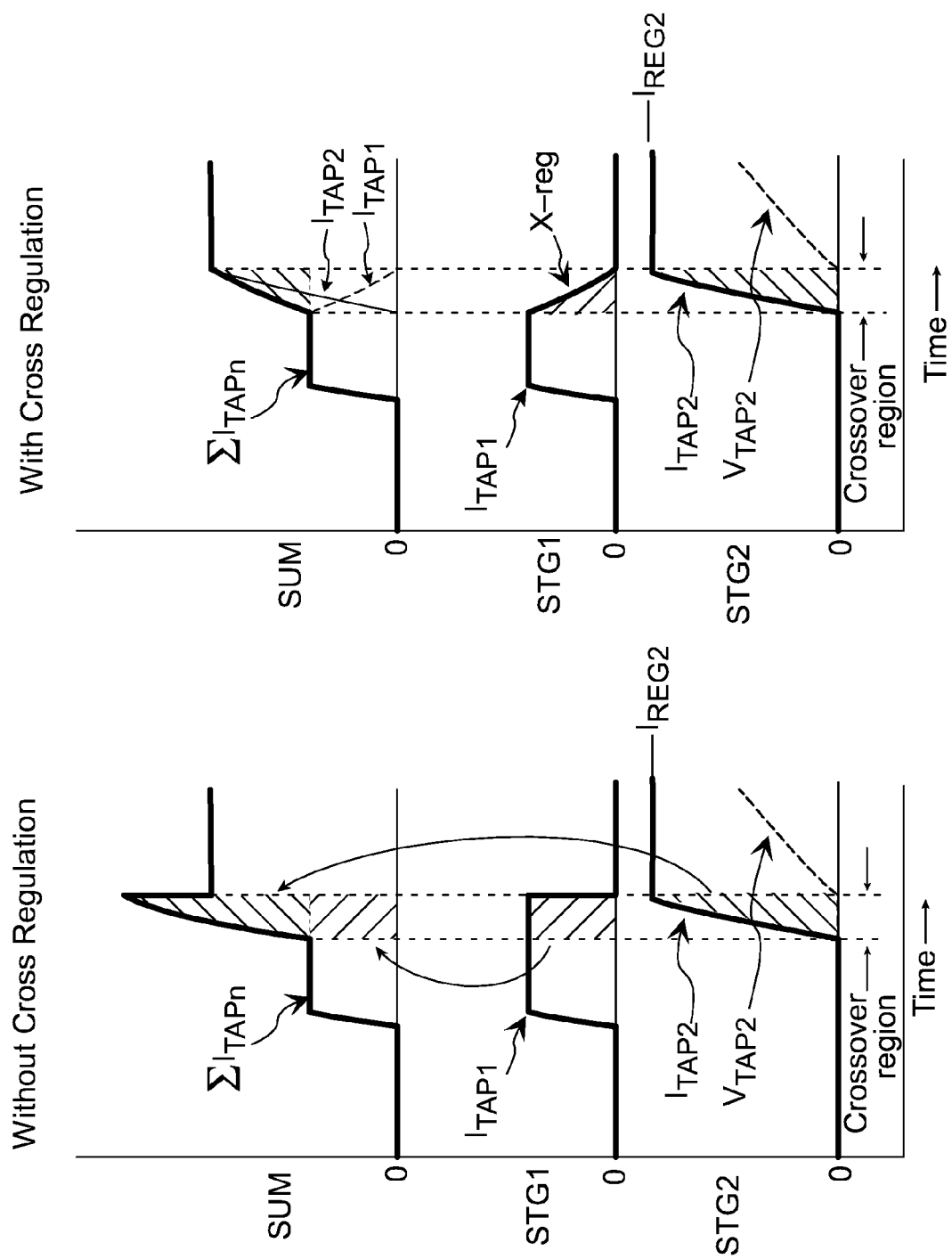
Figure 9: Cross Regulation Waveforms

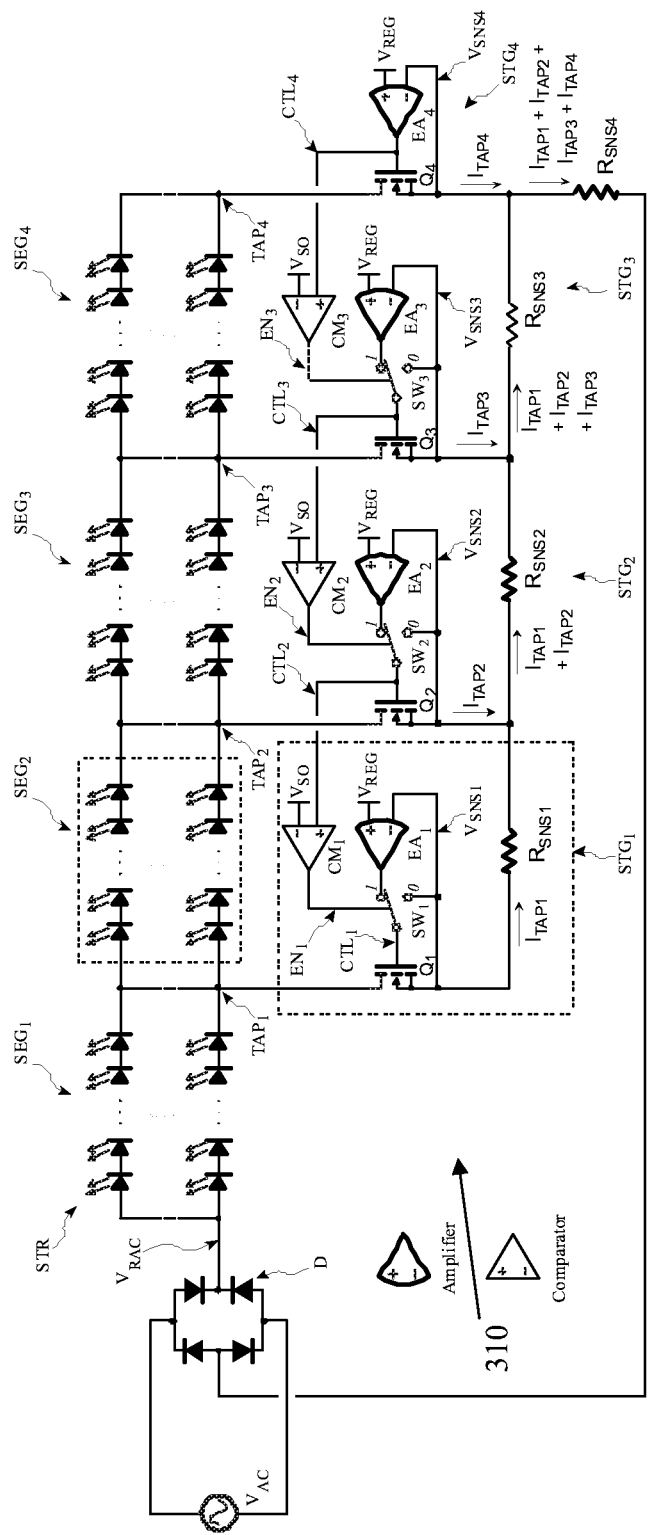
Figure 10: Cross Regulation Circuit

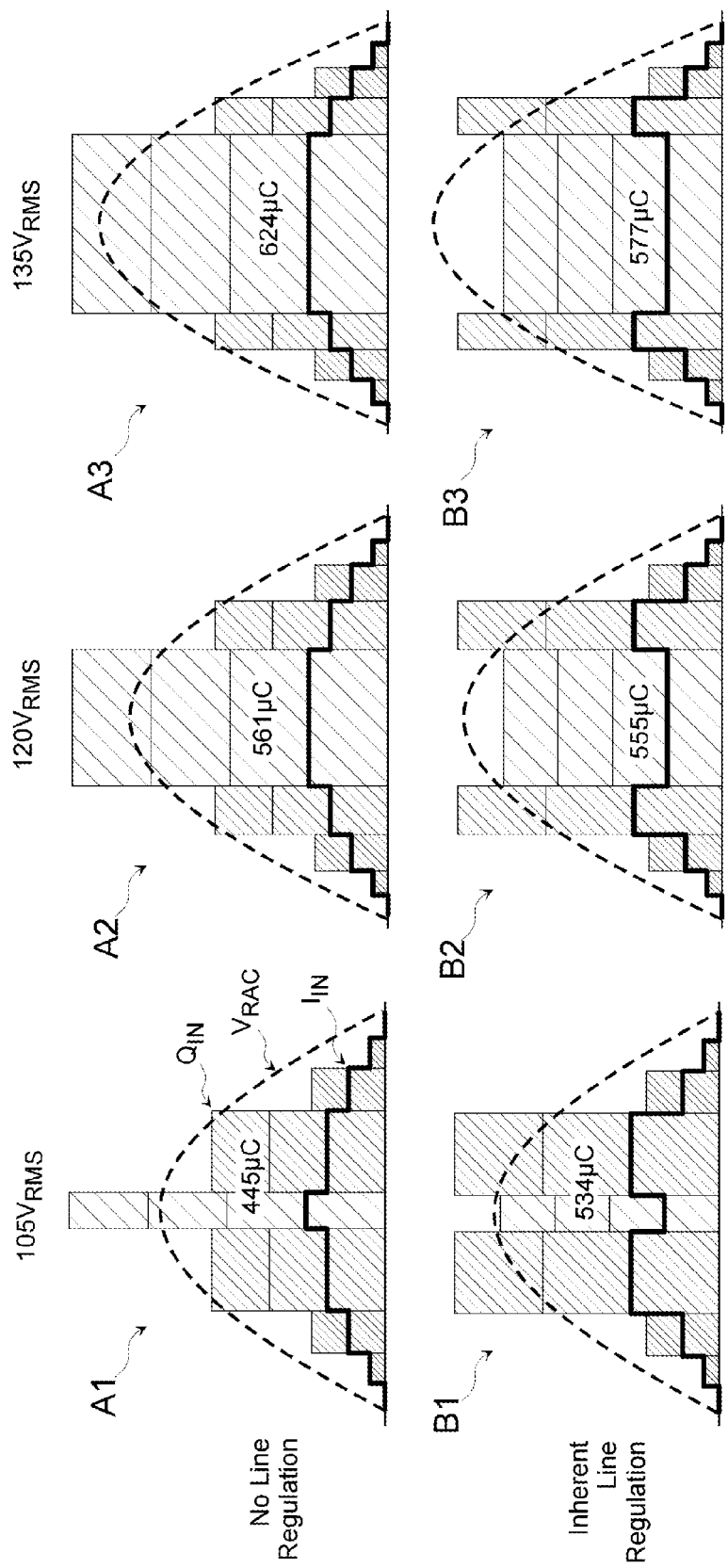
Figure 11: Line Regulation Waveforms

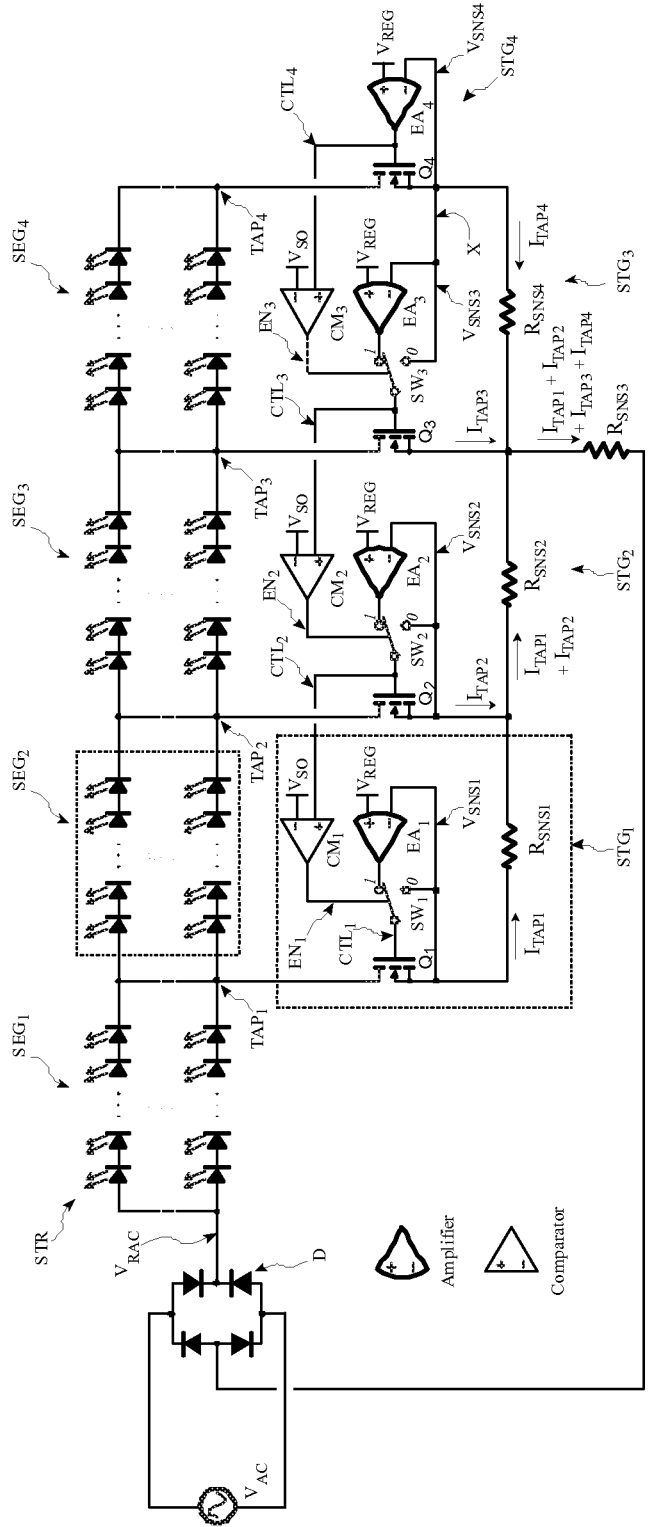
Figure 12: Combined Self-Commutating, Cross Regulation, and Line Regulation Circuits

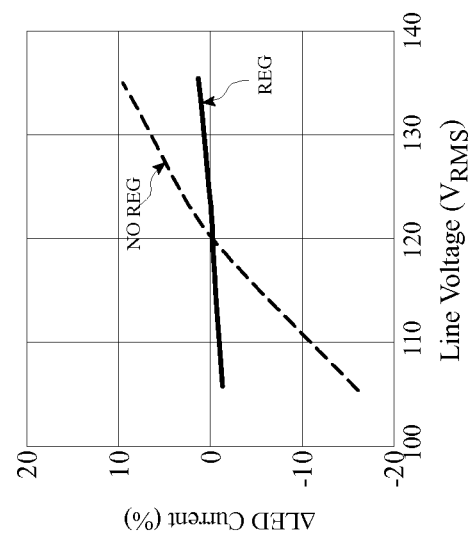
Figure 13: Line Regulation

MULTIPLE STAGE SEQUENTIAL CURRENT REGULATOR

CROSS REFERENCE TO RELATED APPLICATION

This application is a continuation of U.S. application Ser. No. 13/210,155, now U.S. Pat. No. 8,686,651, filed on 15 Aug. 2011, issued on Apr. 1, 2014, and titled "Multiple Stage Sequential Current Regulator," which claims priority from U.S. provisional application 61/475,196, filed 13 Apr. 2011, both of which are incorporated herein by reference in their entirety.

TECHNICAL FIELD

This invention relates to constant current linear regulators, and more particularly to light emitting diode (LED) drivers that are powered from an alternating (AC) voltage source.

BACKGROUND OF THE INVENTION

To save energy, there is an effort to replace incandescent light bulbs with more efficient alternative light source. One alternative is the fluorescent lamp, especially the compact fluorescent lamp. While fluorescents addresses the energy issue, it introduces another concern. Fluorescent lamps, whether intended as a screw-in replacement for incandescent or as the traditional tube style, contain toxic mercury. This runs counter to a parallel effort to reduce toxic elements from our waste stream.

Light emitting diodes (LED) are an alternative that do not contain mercury, are far more efficient than incandescent bulbs, and can surpass the efficiency of fluorescent bulbs. To be compatible with normal AC line voltage, however, special circuitry is needed to convert the AC line voltage into a DC current suitable for driving the LEDs.

Referring to FIG. 1, there is shown a simple driver circuit of the prior art consisting of a rectifier (D), an energy storage capacitor (C), and a linear current regulator (REG) that is used to convert the AC supply voltage (VAC) to a constant current DC source for driving LEDs. A drawback of this circuit is the power dissipated in the current regulator (REG), which varies with line and load voltage, resulting in inefficient operation. A further disadvantage is poor power factor as high current pulses are drawn from the AC source during peak charging of the energy storage capacitor (C). These pulses generate line current harmonics which may not be in compliance with regional regulations. Additionally, the storage capacitor (C) is a further drawback of this circuit since it typically is a high voltage electrolytic type which is bulky and subject to failures in high temperature environments.

Referring to FIG. 2, there is shown a switching regulator circuit of the prior art employing inductors to convert AC voltage (VAC) into DC current. Although the circuit with inductors is more efficient, a downside includes complex design, relatively high printed circuit board area, conducted EMI, and expensive components. Components include inductors (L1 and L2), high voltage electrolytic capacitors (CS), high voltage power transistors (Q), high voltage film capacitors (CHV), and high voltage-fast recovery rectifiers (D2). Electrolytic capacitors (CS) are especially troublesome as they are bulky and can be a major contributor to system failure. To provide power factor correction (PFC) additional circuitry is needed. An input filter is needed to control injected noise back into the AC power line. To provide compatibility with lamp dimmers, yet more circuitry is required.

Referring to FIG. 6, there is shown an LED driver circuit of the prior art using a central sequencer, with the sequencer depicted as a functional block. There are several methods to implement the sequencer, the straightforward approach is to monitor the rectified AC (VRAC). When VRAC passes predetermined voltage levels the appropriate current control element is enabled or disabled. The drawback of this method is that the predetermined voltage levels might not match the forward voltage drop of the LED segments. This is especially true over temperature as LEDs exhibit an approximate $-2$ mV/° C. temperature variation. Multiplied by the number of serially connected LEDs in the string can result in significant mismatch. Premature enabling of a downstream control element with the simultaneous disabling of its' upstream neighbor occurs when there is not enough voltage to forward bias the LED segment, resulting in gaps in the input current waveform which may produce conducted EMI problems. In addition, it results in underutilization of the LEDs. Conversely, if the mismatch enables the control elements too late, it results in overlap and current spikes. Other drawbacks include the need for additional circuitry, another high voltage connection to VRAC, and the need to employ LEDs with consistent forward voltage drop.

An ideal LED driver circuit would consist of a small, low cost integrated circuit, driving a string of low cost, low to medium brightness LEDs (instead of high cost, high brightness LEDs) and requiring no inductors, no capacitors (especially electrolytic), no heat sink, and a few inexpensive components such as a bridge rectifier and a few resistors to configure and optimize the performance of the driver, while providing high efficiency, high power factor, lamp dimming compatibility, good line and load regulation, low line current harmonics, and low conducted EMI. Accordingly the present invention disclosed herein describes such a driver circuit.

SUMMARY OF THE INVENTION

An LED driver circuit for controlling direct current supplied to a plurality of serially connected segments of Light Emitting Diodes (LEDs) receives current from a source of rectified alternating current voltage. The driver circuit comprises a plurality of current control elements, wherein each current control element has two ends. The first end of all the current control elements are connected to the return node of rectified alternating current voltage. A second end of each current control element is connected to a different end of each segment along the plurality of serially connected segments of LEDs. Each control element is enabled or disabled in sequence as the rectified AC voltage rises and falls. The sequencing of the current control elements is distributed among the control elements themselves, providing self-commutation and eliminating the need for a central sequencing circuit.

BRIEF DESCRIPTION OF THE DRAWINGS

FIG. 1 is a circuit diagram of an LED driver circuit of the prior art.

FIG. 2 is a circuit diagram of another LED driver circuit of the prior art.

FIG. 3 is a generalized circuit diagram of an LED driver circuit of the present invention.

FIG. 4 are timing diagrams of the operation of the driver circuit of the present invention.

FIG. 5 is a schematic diagram of various embodiments of the current control element for use in the LED driver circuit of the present invention.

FIG. 6 is a circuit diagram of prior art employing a centralized sequencer to control the sequential operation of the current control elements.

FIG. 7 is a circuit diagram of one embodiment of an LED driver circuit of the present invention with a decentralized controller or a self-commutating circuit.

FIG. 8 is a graph showing the relationship between voltage and current of a string of LED for use in the driver circuit of the present invention.

FIG. 9 are timing diagrams of an LED driver circuit with and without cross regulation.

FIG. 10 is a circuit diagram of one embodiment of an LED self-commutating driver circuit of the present invention with cross regulation.

FIG. 11 are timing diagrams of an LED driver circuit with and without line regulation.

FIG. 12 is a circuit diagram of one embodiment of an LED self-commutating driver circuit of the present invention with cross regulation and line regulation.

FIG. 13 is a graph showing the relationship between voltage and current of line regulation in the LED driver circuit of the present invention.

DETAILED DESCRIPTION OF THE PREFERRED EMBODIMENT

Referring to FIG. 3 there is shown a generalized schematic circuit diagram of an LED driver circuit 10 of the present invention. An AC voltage source (VAC) provides power to the driver circuit 10. In this example, a full-cycle rectifier (D), comprising of a full wave bridge rectifier with four diodes converts the alternating polarity of VAC to a positive voltage. This rectified AC voltage (VRAC) is provided to the top of the LED string (STR). The string is divided into segments (SEG1 thru SEG4), which are connected in series. Within each segment, the segment may consist of any combination of series and parallel connected LEDs, or even just a single LED. The junction between segments, including the bottom of the string (TAP1 thru TAP4) are connected to current control elements, or regulators (REG1 thru REG4). Switches SW1 thru SW4 are generalized elements allowing the regulators of each stage to be individually enabled/disabled. Alternatively, the circuit 10 can be a self commutating circuit 210 as shown in FIG. 7. Initially the first regulator (REG1) is enabled but does not conduct current until the rectified AC voltage VRAC rises high enough to forward bias the LEDs upstream from the first regulator REG1, i.e. the LEDs in SEG1 are biased. Regulator 1 is turned off when the next downstream regulator (REG2) begins conducting and takes over. This occurs when the LEDs in SEG1 and SEG2 are both biased. The sequence for the remaining stages is repeated until the last stage (STG4) or the peak VAC is reached. The sequence is reversed on the down slope of VRAC.

FIG. 4 is a series of timing diagrams showing the currents, voltages, and power dissipation of the regulators and LED string segments for a half cycle of the AC supply frequency. For this timing example, an implementation using four constant current regulators is presented. The left column, rows 2-5 (i.e. timing diagrams 12b-12e) shows the current thru each regulator (ITAP1 thru ITAP4), the voltage at the regulator (VTAP1 thru VTAP4), and power dissipated in the regulator (PTAP1 thru PTAP4). Power is the product of instantaneous voltage and current. The top-left panel, i.e. diagram 12a, shows the sum of the tap currents (ΣITAPn), the rectified AC voltage applied to the top of the string (VRAC), and the sum of power dissipation (ΣPTAP). The second column, rows 2-5, i.e. timing diagrams 14b-14e, shows the current thru the LED string segment (ISEG1 thru ISEG4), the segment voltage drop (VSEG1 thru VSEG4), and power dissipated in the segment (PSEG1 thru PSEG4). The top-right panel, timing diagram 14a, shows the overall input current (IIN), the rectified AC voltage applied to the top of the string (VRAC), and the sum of segment power dissipation (ΣPSEGn). The hatched area represents the total energy delivered to the LEDs during a half cycle. Multiplying by twice the line frequency yields the average power. Comparing the hatched areas between regulator power dissipation (losses) and LED power provides a graphical example of overall driver efficiency. Actual implementations can achieve 85-90% efficiency over typical line voltage range.

Referring now to FIG. 5, there is shown various current control circuits 20 that may be used in the driver circuit 10 of the present invention. The current regulators 20 may control current in multiple ways including, but not limited to, a constant current (REG1), a current dependent in whole or in part on the applied voltage including a resistor (REG2), a resistor and constant-current sink connected in parallel (REG3), a resistor and constant-current sink connected in series (REG4), both a resistor connected in series and parallel with a constant-current sink (REG5), a current inversely proportional the applied voltage (REG6), and power limiting (REG7). In addition, the current regulator circuit 20 may be an arbitrary function of the AC supply voltage independent of or in conjunction with the aforementioned circuits 20.

Sequencing

There are a number of methods for sequencing the different stages (e.g. STG1-STG4) on and off depending on the nature of the current regulators. Referring back to FIGS. 3 and 6, the default state of each regulator REG1, REG2, etc. is enabled but not necessarily conducting if the rectified AC voltage is lower than the sum of the segment voltage drops upstream from the regulator. The first regulator REG1 to conduct as VRAC rises is connected to the first tap TAP1 after the rectifier D since the first tap TAP1 is held close to zero volts by the normally on regulator REG1. The next regulator REG2 to conduct is at the second tap TAP2 when VRAC rises above the forward voltage drop of the first two segments, i.e. SEG1 and SEG2. When the second regulator REG2 begins conducting, the previous regulator REG1 is turned off. This sequence repeats for all the taps or sooner if VRAC is less than the total string voltage drop. The sequence is reversed on the down slope of VRAC. To accommodate a wide supply voltage range, the LED string may be made long enough to minimize headroom voltage at the last stage, allowing some of the lower segments to lose forward bias and extinguish at low supply voltages. The drive current wave shape can be tailored via choices of tap currents for each stage combined with the number of series-connected LEDs in each string segment (voltage drop). The wave shape affects driver performance including output power, efficiency, line and load regulation, input voltage range, LED utilization, power factor, and line current harmonics. Given that the number of design variables is twice the number of stages, the driver circuit 10 or 110 can be configured to optimize one or more performance criteria.

Self-Commutating Sequencing

A self-commutating method that inherently sequences the current control elements at the most appropriate time without the need for more complex circuits that make measurements of input amplitude and determine timing. These circuits must hold information from previous cycles, requiring a memory device such as a capacitor or digital memory. For self-commutation, signals that could be used might include the regulator output voltages, the regulator error amplifier voltage, and regulator current.

Referring to FIG. 7 there is shown an embodiment of a self-commutating circuit 210 using constant current regulators and sequencing based on the state of the regulators. Tap current is controlled by pass transistors Q1-Q4. Switches SW1-SW3 are generalized elements to illustrate sequencing. Each switch is controlled by a comparator (CM1-CM3) which provides a signal (EN1-EN3) based on whether the adjacent downstream regulator is in or out of regulation. These signals are used to automatically sequence the regulators in the proper order and at the appropriate times. The switches enable or disable the first 3 regulators by connecting the gates of each pass transistor to either the output of an error amplifier (EA1-EA3) or to the source terminal of the same pass transistor. When connected to the error amplifier (position 1), the regulator is enabled and may or may not be conducting current depending on whether VRAC is high enough to forward bias the LEDs upstream from the regulator. If enabled but current is zero or below the regulation point established by VREG/RSNSn, the gate control voltage (CTL1-CTL4) is at the maximum output voltage capability of the error amplifier. When SW1 connects the gate to the source (position 0), the regulator is disabled and no current flows thru the pass transistor. The last stage is normally always enabled.

Using the first stage (STG1) as an example, when stage 2 is enabled and in regulation, its control voltage (CTL2) is below the first stage's VSO threshold. The comparator responds by asserting the first stage's enable input (EN1) to a logic 0. This sets SW1 to position 0 and shorting Q1's gate to its source and thus disabling stage 1.

Beginning at the AC supply voltage zero crossing, VRAC will initially be at zero volts. All the regulators will initially be enabled. Starting at the last stage (STG4), no current will be flowing thru pass transistor Q4. Regulator REG4 will be out of regulation with the output of error amplifier EA4 at maximum output voltage. This signal (CTL4) exceeds stage 3's comparator VSO threshold, in turn causing CM3's output (EN3) to go high. This places SW3 in the 1 position, enabling stage 3. With VRAC still at zero volts, no current will flow thru Q3. The response of stage 3 will be the same as in stage 4, with the enable signal propagating thru all stages up to the first stage (STG1).

Continuing with the sequence of events, VRAC will eventually rise to a voltage that forward biases the first LED string segment (SEG1). With stage 1 enabled, current will begin flowing until it reaches the regulation point established by VREG/RSNS1. At this point, stage one is acting as a constant current sink with high dynamic resistance, freeing the voltage at TAP1 to rise with rising VRAC. When it rises to the point where SEG2 is forward biased, current begins flowing thru Q2. When it rises higher, STG2 achieves regulation and stage 2's gate control voltage CTL2 is below shut-off threshold VSO. This asserts EN1 low, forcing the control signal low and thereby disabling stage 1. VRAC continues rising and stage 3 begins conducting. When it achieves regulation, its' control signal forces stage 2s' control signal low, disabling stage 2. With stage 2s' control signal below VOS, stage 1 remains disabled. Through this mechanism, all stages upstream from the most downstream regulator with enough voltage to achieve regulation are disabled. This inherent self-commutation provides optimal performance. The cycle repeats for the remaining downstream stages until VAC peaks and begins falling. When it falls enough to no longer forward bias SEG4, stage 4 goes out of regulation, re-enabling stage 3. The cycle repeats back up the string, re-enabling the upstream stages. The overall cycle repeats with the AC supply frequency.

Output Cross Regulation

Because the LEDs' voltage versus current (V-I) curve gradually transitions from non-conducting to conducting, combined with the finite slope of the AC sine voltage, the current into a regulator increases gradually as line voltage rises. Referring to FIG. 8, there is shown a voltage-current graph that represents the V-I characteristics of the LED string which is a composite of the individual LEDs in the segment. When the voltage across the segment is less than VA, the current thru the segment is for practical purposes zero. When the segment voltage is between VA and VB, the regulator is conducting but at a current less than the regulation point (IREG). The regulator is turned fully on, holding tap voltage to near zero volts as current flows thru it. Above VB the regulator maintains current at IREG and the tap voltage is free to rise with rising VRAC.

Referring now to FIG. 9, there is shown a timing diagram of the operation of the circuit 10, with cross regulation and without cross-regulation. During the crossover interval (VA to VB in FIG. 8), current at ITAP2 is flowing while the regulator is below the regulation point (IREG2). Recall that the example implementation uses the state of regulation of the downstream stage to sequence the stages, regulator 2 not being in regulation leaves regulator 1 enabled. In this crossover region both stages will be conducting simultaneously. Once regulator 2 achieves regulation, regulator 1 is disabled. In the left column of FIG. 9, which denotes the circuit without cross regulation, the hatched areas below ITAP1 and ITAP2 identifies the overlap between stages 1 and 2 when both stages are conducting (ITAP1 and ITAP2). The two currents add, with the sum shown in the top-left waveform (ΣITAPn). Peaking is the result and generates line current harmonics that can violate regulations in some regions of the world. In addition, the steep edges of the peaking generates harmonics extending into the Megahertz region which can cause electromagnetic interference (EMI) and also violate regional regulations.

To avoid using inductor-capacitor EMI filters to reduce noise injected into the AC line, the peaking must be eliminated and a smooth transition between stages realized to reduce harmonics to an acceptable level.

Cross-regulation, where the output of one regulator affects the control loop of another regulator may be used to solve the problem. The right hand column of FIG. 9 shows the desired behavior, i.e. with cross regulation. To compensate for peaking, the current thru the upstream stage must be reduced proportionally as the current thru the adjacent downstream stage increases. The hatched areas for ITAP1 and ITAP2 show the region where both stages are simultaneously conducting. This time, however, the ITAP1 curve is decreasing as ITAP2 current is increasing. The currents largely cancel, the remnant hatched region in the top-right panel the result of the difference between the two stage's regulation currents and provides gradual transitions between stages rather than a sharp step. This further reduces higher order harmonics.

Referring to FIG. 10, there is shown an embodiment of the driver circuit 310 with the self-commutating feature of FIG. 7 and cross-regulation. In the circuit 310 shown in FIG. 10, sense resistors (RSNS1-RSNS4) are serially connected between stages to implement the cross-regulation. A downstream stage, when conducting, injects current into the resistor chain (RSNS1-RSNS4), causing the sense voltage in upstream stages to increase. In this particular case, the only stage enabled and in regulation is the next upstream stage. The increased sense voltage causes the next upstream stage's control loop to reduce current. This cross-regulation cancels out the overlap, eliminating peaking.

Using stage 3 (STG3) as an example, starting with VRAC at a voltage high enough to bias the first two segments but low enough to not bias the third segment (SEG3), stage 2 (STG2) is enabled and regulating while stage 3 is on but not conducting. As VRAC increases, segment 3 becomes biased and begins conducting at a current less than the regulation point. The control voltage for Regulator 3 will be at the maximum output voltage, keeping stage 2 enabled. VRAC is not high enough to bias segment SEG4 and contributes no current to the resistor network. Stage 1 (STG1) is disabled and also contributes no current. Since stage 2 is the only regulator enabled and regulating, its control loop establishes the response to overlap current. The injected ITAP3 current increases the voltage at VSNS3. This also increases the voltage further up the sense resistor chain. The increased voltage at VSNS2 causes the control loop of stage 2 to reduce ITAP2 current to maintain VREG at VSNS2. Since stage 1 and stage 4 contribute no current, the equation describing the relationship between ITAP2 and ITAP3 simplifies to:

$$I_{TAP2} = \frac{V_{REG} - I_{TAP3} \cdot (R_{SNS3} + R_{SNS4})}{R_{SNS2} + R_{SNS3} + R_{SNS4}} = I_{SET2} - \frac{I_{SET2}}{I_{SET3}} I_{TAP3}$$

Inherent Line and Load Regulation

An LED lamp should exhibit little change in brightness as the supply voltage changes (line regulation). In addition, lamp-to-lamp brightness should be consistent despite differences in LED voltage variations (load regulation). Variations in line and load are similar in that a decrease in load voltage is effectively an increase in line voltage. The present invention provides a means for compensating or providing immunity to line and load voltage variations without the need for extra circuitry.

Since light output is proportional to LED current rather than power, the sum of each LEDs' average current should be the line and load regulation metric since it is most representative of total light output. The value is represented as θ with units of mA·NLED, where NLED is the number of LEDs in the lamp. Line regulation is Δ(mA.NLED)/ΔVAC.

If the string current follows the rectified sine wave voltage, poor line regulation will result. As the AC voltage increases so does the current. This increases input power to the square of the variation. To maintain efficiency, the increased input power is used to drive the LEDs at a higher current, directly causing a change in brightness. A fixed-amplitude sine current is an improvement. Near-unity power factor can be attained but since input voltage still varies, input power varies linearly with variation, causing a change in brightness. Still not good regulation. One solution is to decrease input current as input voltage amplitude increases in order to maintain a constant input power. This approach becomes more complex, requiring more circuitry, including a capacitor to average the required measurements of line voltage. This runs counter to the goal of a simple circuit having few components. A more integrated approach is needed, one that can easily be incorporated into the self-commutating, cross-regulating driver without an increase in circuitry complexity or additional components.

Consider a sequential driver circuit having fixed-value, constant-current regulators for the current control elements. The current waveform approximates a sine wave when operated at nominal line voltage. As input voltage varies, the current regulators maintain their constant current. When input amplitude increases, the dwell time at the last stage becomes longer and the input current waveform 'flat tops'. Since the last stage has the highest current, the increased dwell time raises the average LED current, resulting in poor line regulation. Referring to the upper row of FIG. 11 (i.e. waveforms A1, A2 and A3 of FIG. 11), the three waveforms show the rectified supply voltage (VRAC), the input current (IIN), and NLED·mA) for low, nominal, and high line voltages. The hatched areas show the NLED·mA for each segment when each stage is active. The total hatched area is proportional light output. Note how the area increases with increasing line voltage.

Referring to the second row of FIG. 11 (i.e. waveforms B1, B2 and B3 of FIG. 11), and to FIG. 12, line regulation is improved by lowering the current in the last stage and optionally increasing current in the next-to-last stage. This may be described as 'peak inversion'. Although decreasing the last stage alone can achieve good regulation, adjusting both stages provides a cleaner waveform. As input amplitude increases, the higher current, next-to-last stages' on-time gets pushed further down the sides of the sine wave where the slope is steeper. This shortens the duration of the highest current dwell time, lessening its contribution to average current. Meanwhile, the lower-current last stage dwell time gets wider, increasing the lower current's contribution to the average. With proper choice of currents and voltages, near flat line regulation can be achieved over a reasonable range of input voltages. Although the wave shape diverges from an ideal sine wave, reasonable line regulation can be achieved while meeting power factor, line current harmonics, and conducted EMI requirements. FIG. 13 shows the line regulation without peak inversion (dashed line) and with peak inversion (solid line).

Integration

To attain the best performance, all the features previously presented must be incorporated into a complete driver. These features include self-commutating sequencing for adaptability, cross-regulation to eliminate peaking, and peak inversion of the current waveform for line/load regulation.

Combining inherent line regulation with cross-regulation presents a special case for the current sense resistor network. The sense resistor arrangement shown in FIG. 7 only allows increasing currents. Inherent line regulation calls for a decrease of current in the last stage. The arrangement shown in FIG. 11 directs tap 3 current into sense resistor 3. This creates the voltage needed for cross regulation of the upstream regulators as stage 3 current transitions from zero to the regulation point. At the same time, the current sense feedback point for stage 3 is moved to stage 4. As long as the instantaneous VRAC is low enough to not forward bias the last segment, no current will flow thru sense resistor 4. Thus there will be no voltage drop across the resistor, essentially rendering it invisible and allowing regulator 3 to directly sense the voltage across sense resistor 3. As the last regulator begins conducting, a voltage drop is created across sense resistor 4 which adds to the sense voltage seen by regulator 3. Regulator 3 responds by lowering tap 3 current. Thus tap 3 current decreases as tap 4 current increases, smoothing the transition to a lower current.

LED Utilization

As the supply voltage rises and falls at the line frequency, each LED string segment is energized for a portion of the AC cycle, with duty cycle decreasing from the first segment to the last. This has the potential to underutilize the LEDs towards the bottom of the string, which effectively increases LED cost.

To compensate, the LEDs are overdriven when duty cycle is low to obtain the average current rating. Low current, such as 20 mA, LEDs are less sensitive to peak currents than high current LEDS. Some can tolerate crest factors up to 5× at 1/10 duty cycles. In addition, lower numbers of under driven LEDs are used at the bottom of the string while the upper segments parallel LEDs to allow more current at the higher duty cycles.

From the foregoing, it can be seen that the present invention provides an AC line-powered LED driver circuit consisting of simple, compact, and inexpensive circuitry, avoiding expensive, bulky, and failure-prone components such as electrolytic capacitors, inductors, and high-voltage/high-current diodes and transistors. At the same time it must be adaptable to worldwide line voltages, surpass regional regulations for line current harmonics and conducted EMI, achieve high efficiency, exhibit high power factor, use low-cost/low-current LEDs, posses good line and load regulation, and be compatible with conventional lamp phase dimmers. The decentralized, self-commutating nature of the invention automatically provides the most optimum performance.

The current control circuitry portion of the present invention can be integrated in a small silicon chip, with the only additional components for a complete driver include a bridge rectifier, a few small resistors, and components for transient protection.

The example circuits and waveforms shown in the Figures depict one possible implementation out of many possible implementations. The example circuits employ constant-current regulators for the current control elements. Other methods of controlling current may be substituted. For example, FIG. 5 shows a sampling of various means of controlling current. Although the example driver circuit consists of four stages driving an LED string divided into four segments and intended for 120VAC operation, any number of stages may be employed to be compatible with any other supply voltages.

Although the present disclosure includes several techniques to improve performance, including cross regulation to lower line current harmonics and conducted EMI, a current wave shape with inverted peak to provide better line/load regulation, and self-commutating operation for adapting to changing operating conditions, these techniques are included to demonstrate the best performance. The core of the present invention remains the self-commutating sequential, one-at-a-time operation of multiple current control elements connected to multiple taps along a string of LEDs supplied from a rectified AC source.

What is claimed is:

1. An LED driver circuit for controlling direct current supplied to a plurality of serially connected segments of Light Emitting Diodes (LEDs), from a source of rectified alternating current voltage, said circuit comprising:
    a self-commutating circuit comprising a plurality of current control elements, each current control element having two ends, a first end connected to a different end of each segment along the plurality of serially connected segments of LEDs and a second end connected to a path to ground, wherein the path to ground comprises a sense resistor and the path to ground is shared by the second end of each current control element;
    each current control element being coupled to an adjacent current control element by a cross-regulation circuit and controlled by a signal from an adjacent current control element.

2. The LED driver circuit of claim 1 wherein each segment of LEDs comprises a plurality of parallel connected LEDs.

3. The LED driver circuit of claim 1 wherein each segment of LEDs comprises a plurality of serially connected LEDs.

4. The LED driver circuit of claim 1 wherein each segment of LEDs comprises an LED.

5. The LED driver circuit of claim 1 wherein each of the current control elements is substantially identical.

6. The LED driver circuit of claim 5 wherein each of said current control element has a resistor connected in series with a constant current limiter.

7. An LED driver circuit for controlling direct current supplied to a plurality of serially connected segments of Light Emitting Diodes (LEDs), from a source of rectified alternating current voltage, said circuit comprising:
    a plurality of current control elements, each current control element having two ends, a first end connected to a different end of each segment along the plurality of serially connected segments of LEDs and a second end connected to a path to ground, wherein the path to ground comprises a sense resistor and the path to ground is shared by the second end of each current control element;
    each current control element being substantially identical and comprising a resistor connected in series with a constant current limiter and being controlled by a signal from an adjacent current control element, wherein each of said current control element has a resistor connected in series with a constant current limiter, wherein each of said constant current limiter further comprises a transistor, having a terminal for controlling the current flowing therethrough, with said terminal connected to a switch.

8. The LED driver circuit of claim 7 wherein said transistor is an FET transistor.

9. The LED driver circuit of claim 1 wherein each of said current control element has a resistor connected in series with a constant current limiter.

10. An LED driver circuit for controlling direct current supplied to a plurality of serially connected segments of Light Emitting Diodes (LEDs), from a source of rectified alternating current voltage, said circuit comprising:
    a plurality of current control elements, each current control element having two ends, a first end connected to a different end of each segment along the plurality of serially connected segments of LEDs and a second end connected to a path to ground, wherein the path to ground comprises a sense resistor and the path to ground is shared by the second end of each current control element, each current control element being controlled by a signal from an adjacent current control element, wherein said driver circuit is a self-commutating circuit, wherein each current control element controls an adjacent current control element, and wherein each of said current control element has a resistor connected in series with a constant current limiter; and
    a feedback circuit, and wherein each of said constant current limiter further comprises a transistor, having a terminal for controlling the current flowing therethrough, with said terminal connected to a switch; said switch activated by a self-commutating controller.

11. The LED driver circuit of claim 10 wherein said feedback circuit is current sense based upon the current flowing from the transistor to the serially connected resistor.

12. The LED driver circuit of claim 10 wherein said self-commutating controller comprises a comparator circuit for receiving as input the voltage from the terminal to the transistor of an adjacent downstream current controller and a reference voltage and for outputting a control signal supplied to the switch.

13. The LED driver circuit of claim 1, wherein the first end of the plurality of current control elements are connected to each other and to the source of rectified alternating current.

14. The LED driver circuit of claim 1 wherein the first end of the plurality of current control elements are connected to the source of rectified alternating current through a different resistor.

15. The LED driver circuit of claim 1 wherein the source of rectified alternating current voltage source supplies a half cycle rectified alternating current voltage.

16. The LED driver circuit of claim 15 wherein only one current control element is on at a time, with two adjacent current control elements on at the same time during transition between stages.

17. The LED driver circuit of claim 1 wherein the source of rectified alternating current voltage source supplies a full cycle rectified alternating current voltage.

18. The LED driver circuit of claim 17 wherein only one current control element is on at a time, with two adjacent current control elements on at the same time during transition between stages.

19. An LED driver circuit for controlling direct current supplied to a plurality of serially connected segments of Light Emitting Diodes (LEDs), from a source of rectified alternating current voltage, said circuit comprising:
   a self-commutating circuit comprising a plurality of current control elements, each current control element having two ends, a first end connected to a different end of each segment along the plurality of serially connected segments of LEDs and a second end connected to a path to ground, wherein the path to ground comprises a sense resistor and the path to ground is shared by the second end of each current control element, each current control element being coupled to an adjacent current control element by a cross-regulation circuit and controlled by a signal from an adjacent current control element; and
   decentralized means for sequentially operating each of the current control elements.

20. An LED driver circuit for controlling direct current supplied to a plurality of serially connected segments of Light Emitting Diodes (LEDs), from a source of rectified alternating current voltage, said circuit comprising:
   a plurality of current control elements, each current control element having two ends, a first end connected to a different end of each segment along the plurality of serially connected segments of LEDs and a second end connected to a path to ground, wherein the path to ground comprises a sense resistor and the path to ground is shared by the second end of each current control element;
   decentralized means for sequentially operating each of the current control elements, the decentralized means comprising:
      a self-commutating control means for sequentially controlling the operation of each of the current control elements;
      means for cross regulating the operation of each of the current control elements; and
      means for line regulating each of the current of the control elements.

21. The LED driver circuit of claim 20 wherein said self-commutating control means for sequentially controlling the operation of each of the current control elements comprises a control circuit in each of said current control elements for controlling the operation of an immediately adjacent current control element.

22. A self-commutating driver circuit comprising:
   a first current regulator having an output signal indicative of the state of current regulation of said first current regulator;
   a second current regulator having an input for disabling said second current regulator;
   wherein the output signal of said first current regulator is connected to the input of said second current regulator for disabling said second current regulator and the first current regulator and second current regulator are coupled by a cross-regulation circuit;
   wherein each current regulator is connected to a common path to ground, wherein the common path to ground comprises a sense resistor.

23. A self-commutating driver circuit comprising:
   a first current regulator having an output signal indicative of the state of current regulation of said first current regulator;
   a last current regulator having an input for disabling said last current regulator;
   a plurality of serially controlled intermediate current regulators, controlled between the first current regulator and said last current regulator, each of said intermediate current regulator having an input for disabling the intermediate current regulator and an output signal indicative of the state of regulation of the intermediate current regulator inclusive of the state of being disabled, said plurality of serially controlled intermediate current regulators having an initial intermediate current regulator at one end, and a terminal intermediate current regulator at another end;
   wherein the output signal of each intermediate current regulator is connected to the input of an adjacent intermediate current regulator to control the adjacent intermediate current regulator, where the state of the intermediate current regulator is either in regulation or disabled disables the adjacent intermediate current regulator;
   wherein the input of the initial intermediate current regulator receives the output signal of said first current regulator where said first current regulator being in a state of regulation disables said initial intermediate current regulator;
   wherein the input of the last current regulator receives the output signal from the terminal intermediate current regulator, where said terminal intermediate current regulator being in a state of regulation or disabled disables said last current regulator;
   wherein each current regulator is connected to a common path to ground, wherein the common path to ground comprises a sense resistor.

* * * * *